US009777926B2

(12) United States Patent
Dai et al.

(10) Patent No.: US 9,777,926 B2
(45) Date of Patent: Oct. 3, 2017

(54) MIXER ASSEMBLY FOR A GAS TURBINE ENGINE

(71) Applicant: UNITED TECHNOLOGIES CORPORATION, Farmington, CT (US)

(72) Inventors: Zhongtao Dai, Manchester, CT (US); Jeffrey M. Cohen, Hebron, CT (US); Catalin G. Fotache, West Hartford, CT (US); Lance L. Smith, West Hartford, CT (US); Donald J. Hautman, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 170 days.

(21) Appl. No.: 14/593,877

(22) Filed: Jan. 9, 2015

(65) Prior Publication Data
US 2015/0121882 A1    May 7, 2015

Related U.S. Application Data

(63) Continuation of application No. 13/014,388, filed on Jan. 26, 2011, now Pat. No. 8,973,368.

(51) Int. Cl.
*F23R 3/14* (2006.01)
*F23R 3/28* (2006.01)
*F23C 7/00* (2006.01)

(52) U.S. Cl.
CPC .............. *F23R 3/286* (2013.01); *F23C 7/004* (2013.01); *F23R 3/14* (2013.01); *F23R 2900/03343* (2013.01)

(58) Field of Classification Search
CPC .. F23R 3/14; F23R 3/286; F23R 2900/03343; F23C 7/004
See application file for complete search history.

(56) References Cited

U.S. PATENT DOCUMENTS

| 3,703,259 | A | 11/1972 | Sturgess et al. |
| 3,946,552 | A | 3/1976 | Weinstein et al. |
| 5,165,241 | A | 11/1992 | Joshi et al. |
| 5,515,680 | A | 5/1996 | Fujimura et al. |
| 5,540,056 | A | 7/1996 | Heberling et al. |
| 5,816,049 | A | 10/1998 | Joshi |
| 6,082,111 | A | 7/2000 | Stokes |

(Continued)

FOREIGN PATENT DOCUMENTS

| EP | 0041878 A2 | 12/1981 |
| EP | 1193450 A1 | 4/2002 |

(Continued)

OTHER PUBLICATIONS

English Abstract for EP0041878A2—Dec. 16, 1981; 2 pgs.
(Continued)

*Primary Examiner* — Steven Sutherland
(74) *Attorney, Agent, or Firm* — Cantor Colburn LLP

(57) ABSTRACT

A mixer assembly for a gas turbine engine is provided, including a main mixer with fuel injection holes located between at least one radial swirler and at least one axial swirler, wherein the fuel injected into the main mixer is atomized and dispersed by the air flowing through the radial swirler and the axial swirler.

16 Claims, 4 Drawing Sheets

(56) References Cited

U.S. PATENT DOCUMENTS

| | | |
|---|---|---|
| 6,161,387 A | 12/2000 | Green |
| 6,272,840 B1 | 8/2001 | Crocker et al. |
| 6,345,505 B1 | 2/2002 | Green |
| 6,354,072 B1 | 3/2002 | Hura |
| 6,363,726 B1 | 4/2002 | Durbin |
| 6,367,262 B1 | 4/2002 | Mongia et al. |
| 6,381,964 B1 | 5/2002 | Pritchard et al. |
| 6,389,815 B1 | 5/2002 | Hura et al. |
| 6,418,726 B1 | 7/2002 | Foust et al. |
| 6,484,489 B1 | 11/2002 | Foust et al. |
| 6,547,215 B2 | 4/2003 | Matsusaka et al. |
| 6,560,967 B1 | 5/2003 | Cohen et al. |
| 6,609,377 B2 | 8/2003 | Durbin et al. |
| 6,799,427 B2 | 10/2004 | Calvez et al. |
| 6,871,501 B2 | 3/2005 | Bibler et al. |
| 6,968,692 B2 | 11/2005 | Chin et al. |
| 7,010,923 B2 | 3/2006 | Mancini et al. |
| 7,013,635 B2 | 3/2006 | Cohen et al. |
| 7,434,401 B2 | 10/2008 | Hayashi |
| 7,464,553 B2 | 12/2008 | Hsieh et al. |
| 7,537,646 B2 | 5/2009 | Chen et al. |
| 7,546,740 B2 | 6/2009 | Chen et al. |
| 7,565,803 B2 | 7/2009 | Li et al. |
| 7,581,396 B2 | 9/2009 | Hsieh et al. |
| 7,621,131 B2 | 11/2009 | Von Der Bank |
| 7,669,421 B2 | 3/2010 | Saitoh et al. |
| 7,712,315 B2 | 5/2010 | Hautman et al. |
| 7,779,636 B2 | 8/2010 | Buelow et al. |
| 8,973,368 B2 * | 3/2015 | Dai .................... F23C 7/004 60/734 |
| 2004/0079085 A1 | 4/2004 | Mancini et al. |
| 2005/0028526 A1 | 2/2005 | Von Der Bank et al. |
| 2005/0257530 A1 | 11/2005 | Zupanc et al. |
| 2006/0096296 A1 | 5/2006 | Held et al. |
| 2006/0248898 A1 | 11/2006 | Buelow et al. |
| 2007/0017224 A1 | 1/2007 | Li et al. |
| 2007/0028617 A1 | 2/2007 | Hsieh et al. |
| 2007/0028618 A1 | 2/2007 | Hsiao et al. |
| 2007/0028624 A1 | 2/2007 | Hsieh et al. |
| 2007/0137207 A1 | 6/2007 | Mancini et al. |
| 2007/0163263 A1 | 7/2007 | Thomson |
| 2008/0072605 A1 | 3/2008 | Hagen et al. |
| 2008/0078181 A1 | 4/2008 | Mueller et al. |
| 2009/0113893 A1 | 5/2009 | Li et al. |
| 2009/0173076 A1 | 7/2009 | Toon |
| 2010/0050644 A1 | 3/2010 | Pidcock et al. |
| 2010/0115956 A1 | 5/2010 | Toon |
| 2010/0126177 A1 | 5/2010 | Hautman et al. |
| 2010/0263382 A1 | 10/2010 | Mancini et al. |
| 2010/0269506 A1 | 10/2010 | Nonaka et al. |
| 2010/0287946 A1 | 11/2010 | Buelow et al. |
| 2012/0186256 A1 | 7/2012 | Dai et al. |

FOREIGN PATENT DOCUMENTS

| | | |
|---|---|---|
| EP | 2093489 A2 | 8/2009 |
| EP | 2481982 A1 | 8/2012 |
| GB | 2456753 A | 7/2009 |

OTHER PUBLICATIONS

European Search Report for Application No. 12151,964; dated Mar. 20, 2012; 2 pgs.

European Search Report for Application No. 16150812.2-1602; dated May 9, 2016; 7 pgs.

Notice of Opposition for Application No. 12151964.9; dated Apr. 19, 2016.

* cited by examiner

MIXER ASSEMBLY FOR A GAS TURBINE ENGINE

CROSS-REFERENCE TO RELATED APPLICATIONS

This application is a continuation patent application under 35 USC §120 claiming priority to U.S. non-provisional patent application Ser. No. 13/014,388 filed on Jan. 26, 2011.

STATEMENT OF FEDERALLY SPONSORED RESEARCH OR DEVELOPMENT

This invention was made with Government support under Contract No. NNC08CA92C awarded by the National Aeronautics and Space Administration (NASA). The U.S. Government has certain rights in the invention.

FIELD OF THE DISCLOSURE

The subject matter disclosed herein relates generally to combustors for gas turbine engines and more particularly to mixer assemblies for gas turbine engines.

BACKGROUND OF THE DISCLOSURE

Gas turbine engines, such as those used to power modern aircraft, to power sea vessels, to generate electrical power, and in industrial applications, include a compressor for pressurizing a supply of air, a combustor for burning a hydrocarbon fuel in the presence of the pressurized air, and a turbine for extracting energy from the resultant combustion gases. Generally, the compressor, combustor, and turbine are disposed about a central engine axis with the compressor disposed axially upstream or forward of the combustor and the turbine disposed axially downstream of the combustor. In operation of a gas turbine engine, fuel is injected into and combusted in the combustor with compressed air from the compressor thereby generating high-temperature combustion exhaust gases, which pass through the turbine and produce rotational shaft power. The shaft power is used to drive a compressor to provide air to the combustion process to generate the high energy gases. Additionally, the shaft power is used to, for example, drive a generator for producing electricity, or drive a fan to produce high momentum gases for producing thrust.

An exemplary combustor features an annular combustion chamber defined between a radially inboard liner and a radially outboard liner extending aft from a forward bulkhead wall. The radially outboard liner extends circumferentially about and is radially spaced from the inboard liner, with the combustion chamber extending fore to aft between the liners. A plurality of circumferentially distributed fuel injectors are mounted in the forward bulkhead wall and project into the forward end of the annular combustion chamber to supply the fuel to be combusted. Air swirlers proximate to the fuel injectors impart a swirl to inlet air entering the forward end of the combustion chamber at the bulkhead wall to provide rapid mixing of the fuel and inlet air.

Combustion of the hydrocarbon fuel in air in gas turbine engines inevitably produces emissions, such as oxides of nitrogen (NOx), carbon dioxide ($CO_2$), carbon monoxide (CO), unburned hydrocarbons (UHC), and smoke, which are delivered into the atmosphere in the exhaust gases from the gas turbine engine. Regulations limiting these emissions have become more stringent. At the same time, the engine pressure ratio is getting higher and higher for increasing engine efficiency, lowering specific fuel consumption, and lowering carbon dioxide ($CO_2$) emissions, resulting in significant challenges to designing combustors that still produce low emissions despite increased combustor inlet pressure, temperature, and fuel/air ratio. Due to the limitation of emission reduction potential for the rich burn-quick quench-lean burn (RQL) combustor, lean burn combustors, and in particular the piloted lean premixed/partially premixed prevaporized combustor (PLPP), have become used more frequently for further reduction of emissions. However, one of the major challenges for the development of PLPP is the requirement to sufficiently premix the injected fuel and combustion air in the main mixer of a mixer assembly within a given mixing time, which is required to be significantly shorter than the auto-ignition delay time.

Mixer assemblies for existing PLPP combustors typically include a pilot mixer surrounded by a main mixer with a fuel manifold provided between the two mixers to inject fuel radially into the cavity of the main mixer through fuel injection holes. The main mixer typically employs air swirlers proximate and upstream of the fuel injection holes to impart a swirl to the air entering the main mixer and to provide rapid mixing of the air and the fuel, which is injected perpendicularly into the cross flow of the air atomizing the fuel for mixing with the air. The level of atomization and mixing in this main mixer configuration is largely dependent upon the penetration of the fuel into the air, which in turn is dependent upon the ratio of the momentum of the fuel to the momentum of the air. As a result, the degree of atomization and mixing may vary greatly for different gas turbine engine operating conditions (e.g., low power conditions where there is poor atomization and mixing may result in higher emissions than high power conditions where there is better atomization and mixing). In addition, since the fuel injection holes are typically located downstream of the point where the air swirlers produce the maximum turbulence, the degree of atomization and mixing is not maximized, increasing the amount of emissions. Furthermore, since the fuel injection holes are typically located downstream of the air swirlers, the risk of flashback, flame holding and autoignition greatly increases due to the low velocity regions associated with fuel jets and walls. A highly possible source for flashback, flame holding and autoignition in the typical main mixer is caused by a wake region that can form downstream of the fuel injection holes where injected fuel that has not sufficiently penetrated into the cross flow of the air (e.g., when air is flowing at low velocity) will gather and potentially ignite. Another possible source is related to boundary layers along the wall, which is thickened by fuel jets due to reduced velocity.

SUMMARY OF THE DISCLOSURE

A mixer assembly for a gas turbine engine is provided, including a main mixer with fuel injection holes located between at least one radial swirler and at least one axial swirler, wherein the fuel injected into the main mixer is atomized and dispersed by the air flowing through the radial swirler and the axial swirler. This configuration reduces the dependence upon the ratio of the momentum of the fuel to the momentum of the air, increases the degree of atomization and mixing by injecting the fuel at a point of high turbulence, and reduces the potential for flame holding by reducing the potential for forming a wake region and lengthening the potential mixing distance.

According to one embodiment, a mixer assembly for a gas turbine engine is provided. The mixer assembly includes a main mixer comprising an annular inner radial wall, an annular outer radial wall surrounding at least a portion of the annular inner radial wall, wherein the annular outer radial wall incorporates a first outer radial wall swirler with a first axis oriented substantially radially to a centerline axis of the mixer assembly, a forward wall substantially perpendicular to and connecting the annular inner radial wall and the annular outer radial wall forming an annular cavity, wherein the forward wall incorporates a first forward wall swirler with a second axis oriented substantially axially to the centerline axis of the mixer assembly, and a plurality of fuel injection holes in the forward wall between the first outer radial wall swirler and the first forward wall swirler, wherein the first outer radial wall swirler is on a first side of the plurality of fuel injection holes and the first forward wall swirler is on a second side of the plurality of fuel injection holes.

In another embodiment, a mixer assembly for a gas turbine engine is provided. The mixer assembly includes a main mixer comprising an annular inner radial wall, an annular outer radial wall surrounding at least a portion of the annular inner radial wall, wherein the annular outer radial wall incorporates a plurality of outer radial wall swirlers with a first axis oriented substantially radially to a centerline axis of the mixer assembly, a forward wall substantially perpendicular to and connecting the annular inner radial wall and the annular outer radial wall forming an annular cavity, wherein the forward wall incorporates a first forward wall swirler with a second axis oriented substantially axially to the centerline axis of the mixer assembly, and a plurality of fuel injection holes in the forward wall between the plurality of outer radial wall swirlers and the first forward wall swirler, wherein the plurality of outer radial wall swirlers is on a first side of the plurality of fuel injection holes and the first forward wall swirler is on a second side of the plurality of fuel injection holes.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE DISCLOSURE

Figure 1:
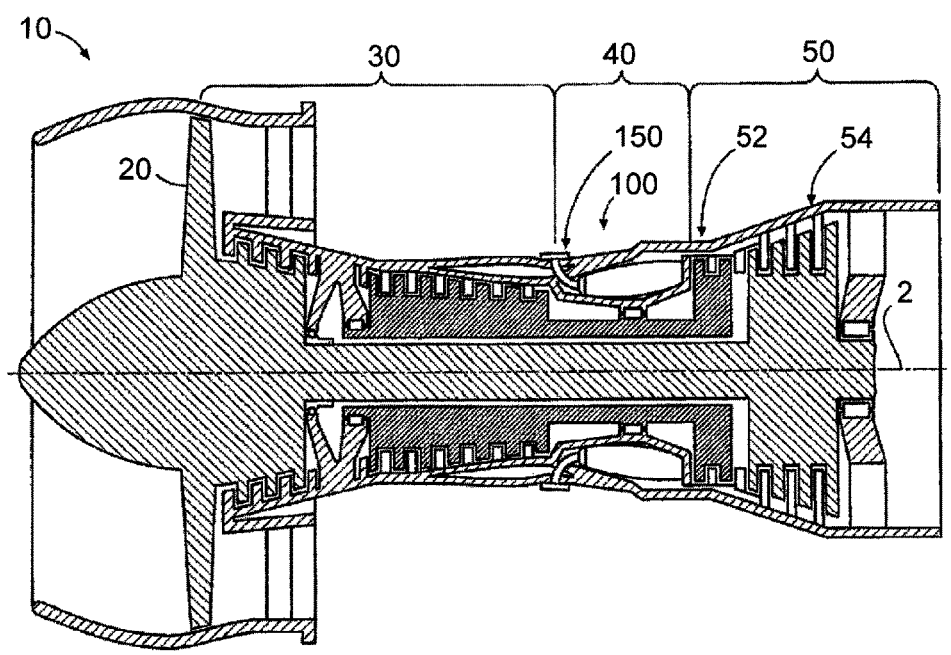
FIG. 1 is a schematic diagram of an exemplary embodiment of a gas turbine engine.

FIG. 1 is a schematic diagram of an exemplary embodiment of a gas turbine engine 10. The gas turbine engine 10 is depicted as a turbofan that incorporates a fan section 20, a compressor section 30, a combustion section 40, and a turbine section 50. The combustion section 40 incorporates a combustor 100 that includes a plurality of fuel injectors 150 that are positioned annularly about a centerline 2 of the engine 10 upstream of the turbines 52, 54. Throughout the application, the terms "forward" or "upstream" are used to refer to directions and positions located axially closer toward a fuel/air intake side of a combustion system than directions and positions referenced as "aft" or "downstream." The fuel injectors 150 are inserted into and provide fuel to one or more combustion chambers for mixing and/or ignition. It is to be understood that the combustor 100 and fuel injector 150 as disclosed herein are not limited in application to the depicted embodiment of a gas turbine engine 10, but are applicable to other types of gas turbine engines, such as those used to power modern aircraft, to power sea vessels, to generate electrical power, and in industrial applications.

Figure 2:
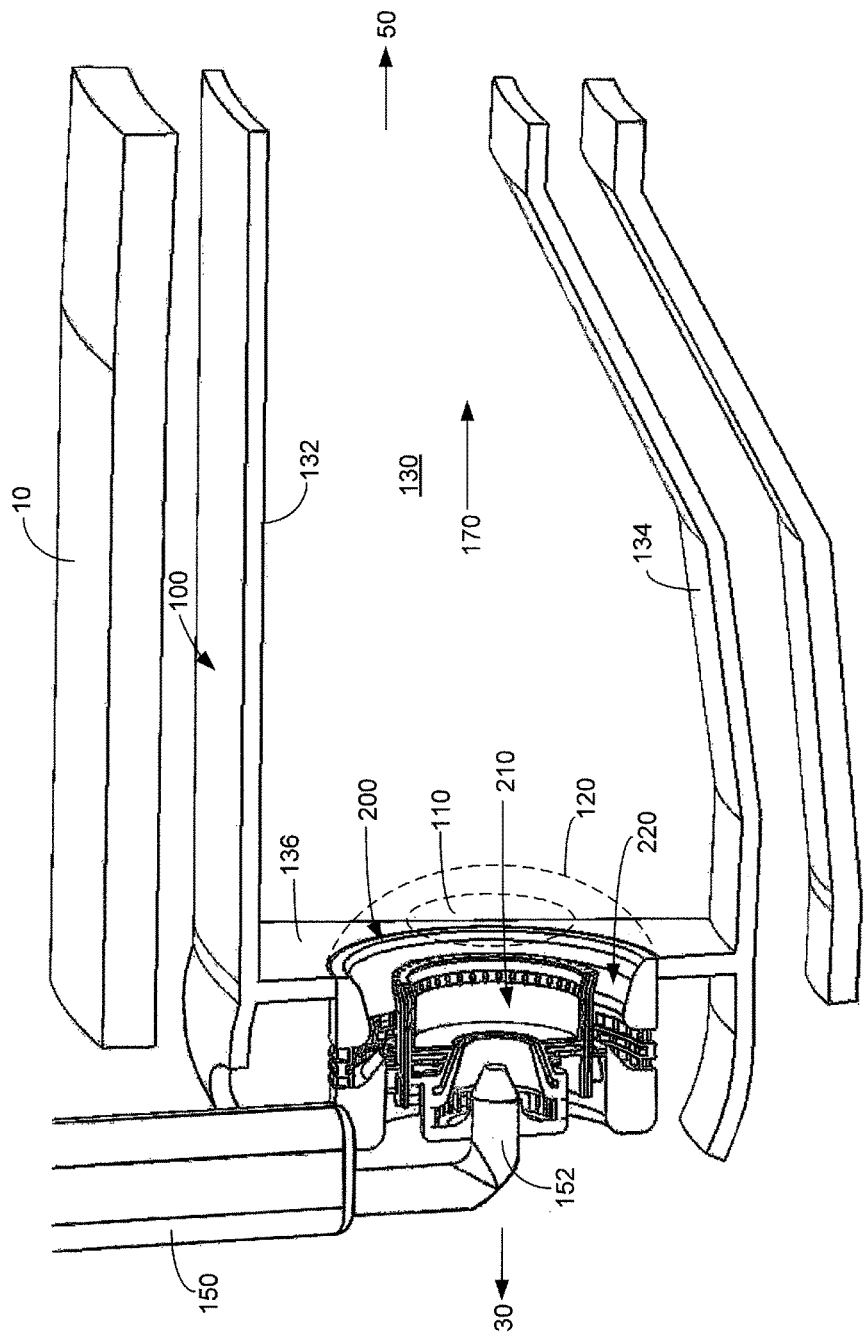
FIG. 2 is a partial perspective view of an exemplary embodiment of a combustor of a gas turbine engine.

FIG. 2 is a partial perspective view of an exemplary embodiment of a combustor 100 of a gas turbine engine 10. The combustor 100 is positioned between the compressor section 30 and the turbine section 50 of a gas turbine engine 10. The exemplary combustor 100 includes an annular combustion chamber 130 bounded by an inner (inboard) wall 132 and an outer (outboard) wall 134 and a forward bulkhead wall 136 spanning between the walls 132, 134 at the forward end of the combustor 100. The bulkhead wall 136 of the combustor 100 carries a plurality of mixer assemblies 200, including the fuel nozzle 152 of a fuel injector 150, a main mixer 220, and a pilot mixer 210. It will be understood that, although only a single mixer assembly 200 is shown in FIG. 2 for illustrative purposes, the combustor 100 may include a plurality of mixer assemblies 200 circumferentially distributed and mounted at the forward end of the combustor 100. A number of sparkplugs (not shown) are positioned with their working ends along a forward portion of the combustion chamber 130 to initiate combustion of the fuel and air mixture. The combusting mixture is driven downstream within the combustor 100 along a principal flowpath 170 toward the turbine section 50 of the engine 10. The fuel and air provided to the pilot mixer 210 produce a primary combustion zone 110 within a central portion of the combustion chamber 130. The fuel and air provided to the main mixer 220 produce a secondary combustion zone 120 in the combustion chamber 130 that is radially outwardly spaced from and concentrically surrounds the primary combustion zone 110.

Figure 3:
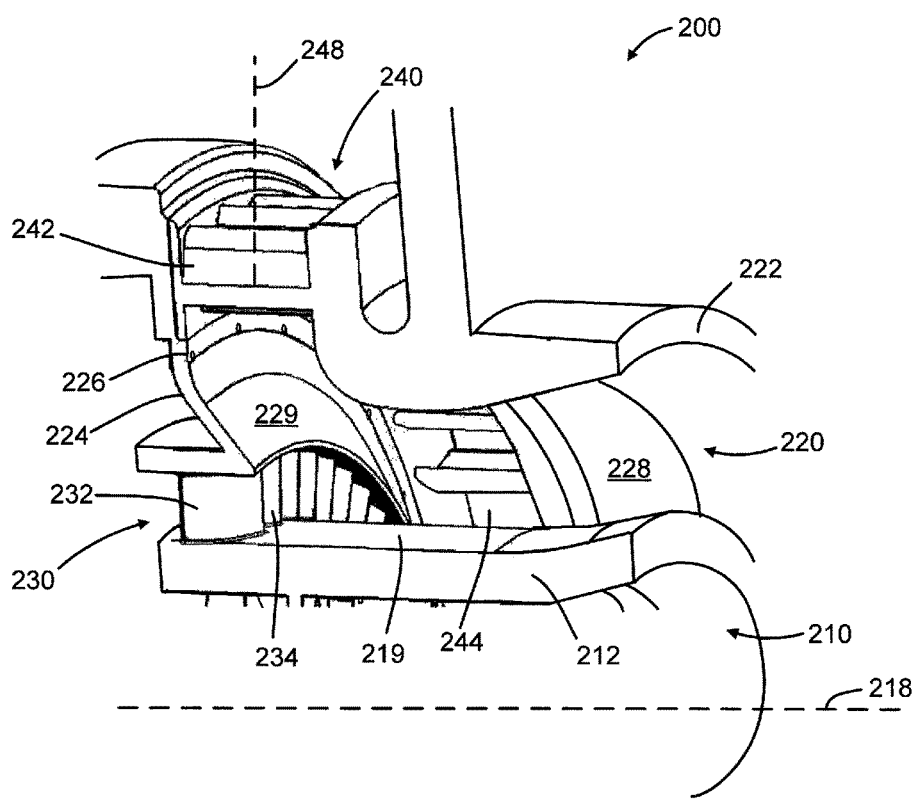
FIG. 3 is an enlarged partial perspective view of an exemplary embodiment of a mixer assembly for the exemplary combustor of FIG. 2.

FIG. 3 is an enlarged partial perspective view of an exemplary embodiment of the mixer assembly 200 for the exemplary combustor 100 of FIG. 2. The exemplary mixer assembly 200 includes a main mixer 220 and a pilot mixer 210. The pilot mixer 210 and the main mixer 220 are concentrically arranged with the pilot mixer 210 located in the center of the main mixer 220, which surrounds a portion of the pilot mixer 210. The mixer assembly 200 has a centerline axis 218. The pilot mixer 210 includes an annular pilot mixer housing 212 separating and sheltering the pilot mixer 210 from the main mixer 220. The main mixer 220 further includes an annular main mixer outer radial wall 222 radially surrounding a portion of the annular pilot mixer housing 212, the outer surface of which forms an annular main mixer inner radial wall 219, and a main mixer forward wall 224 substantially perpendicular to and connecting the annular main mixer outer radial wall 222 and the annular main mixer inner radial wall 219, forming a main mixer annular cavity 228. The annular main mixer outer radial wall 222 further incorporates a first outer radial wall swirler 240, while the main mixer forward wall 224 further incorporates a first forward wall swirler 230 and a plurality of fuel injection holes 226 circumferentially distributed between the first outer radial wall swirler 240 and the first forward wall swirler 230 around the main mixer forward wall 224.

Although shown proximate to the first outer radial wall swirler 240 in the main mixer forward wall 224, the fuel injection holes 226 can be located proximate the first forward wall swirler 230 in the main mixer forward wall 224 as well. The fuel injection holes 226 are in flow communication with a fuel manifold (not shown), which in turn is in flow communication with a fuel supply. Although described with respect to liquid fuel, the exemplary embodiments of mixer assemblies 200 can also be used with gaseous fuel or partially vaporized fuel. As can be seen in FIG. 3, the first outer radial wall swirler 240 is positioned on a first side of the fuel injection holes 226, while the first forward wall swirler 230 is positioned on a second side of the fuel injection holes 226. In one embodiment, the first side is substantially opposite of the second side.

The first outer radial wall swirler 240 is incorporated into the annular main mixer outer radial wall 222 and has an axis 248 oriented substantially radially to the centerline axis 218 of the mixer assembly 200. The first forward wall swirler 230 is incorporated into the main mixer forward wall 224 and is oriented substantially parallel or axially to the centerline axis 218 of the mixer assembly 200. The swirlers 230, 240 each have a plurality of vanes for swirling air traveling through the swirlers to mix the air and the fuel dispensed by the fuel injection holes 226. The first outer radial wall swirler 240 includes a first plurality of vanes 242 forming a first plurality of air passages 244 between the vanes 242. The vanes 242 are oriented at an angle with respect to axis 248 to cause the air to rotate in the main mixer annular cavity 228 in a first direction (e.g., clockwise). The first forward wall swirler 230 includes a second plurality of vanes 232 forming a second plurality of air passages 234 between the vanes 232. The vanes 232 are oriented at an angle with respect to the centerline axis 218 to cause the air to rotate in the main mixer annular cavity 228 in a second direction (e.g., counterclockwise).

In the exemplary embodiment of the main mixer 220 shown in FIG. 3, the air flowing through the first outer radial wall swirler 240 will be swirled in a first direction and the air flowing through the first forward wall swirler 230 will be swirled in a direction substantially opposite of the first direction. Also, in the exemplary embodiment of the main mixer 220 shown in FIG. 3, the air flowing through the first outer radial wall swirler 240 has an axis 248 oriented substantially radially to the centerline axis 218 of the mixer assembly 200, while the air flowing through the first forward wall swirler 230 has an axis oriented substantially axially to the centerline axis 218 of the mixer assembly 200. In this configuration, the fuel is injected through the fuel injection holes 226 between the radial first outer radial wall swirler 240 and the axial first forward wall swirler 230. In one embodiment, the fuel is injected through the fuel injection holes 226 that are oriented substantially perpendicularly to axis 248 and the flow of air from the radial first outer radial wall swirler 240, which atomizes and disperses the fuel. The fuel then is atomized and dispersed again by the flow of air from the axial first forward wall swirler 230, thus atomizing the fuel by airflow from two sides. Although shown proximate to the first outer radial wall swirler 240 in the main mixer forward wall 224, the fuel injection holes 226 can be located proximate the first forward wall swirler 230 in the main mixer forward wall 224 and be oriented substantially perpendicularly to the axis of the first forward wall swirler 230 and the flow of air from the radial first forward wall swirler 230, which atomizes and disperses the fuel. The fuel then is atomized and dispersed again by the flow of air from the axial first outer radial wall swirler 240, thus atomizing the fuel by airflow from two sides. In either configuration, an intense mixing region 229 of fuel and air is created within annular main mixer cavity 228 axially adjacent to the fuel injection holes 226, allowing the majority of fuel and air to be mixed before entering the downstream end of the annular main mixer cavity 228. This configuration reduces the dependence upon the ratio of the momentum of the fuel to the momentum of the air, increases the degree of atomization and mixing by injecting the fuel at a point of high turbulence, and reduces the potential for flame holding by reducing the potential for forming a wake region and lengthening the potential mixing distance. The configuration of the vanes in the swirlers may be altered to vary the swirl direction of air flowing and are not limited to the exemplary swirl directions indicated. Furthermore, the number of radial and axial swirlers can be modified (e.g., the first outer radial wall swirler 240 can be replaced by a plurality of radial swirlers and the first forward wall swirler 230 can be replaced by a plurality of axial swirlers).

Figure 4:
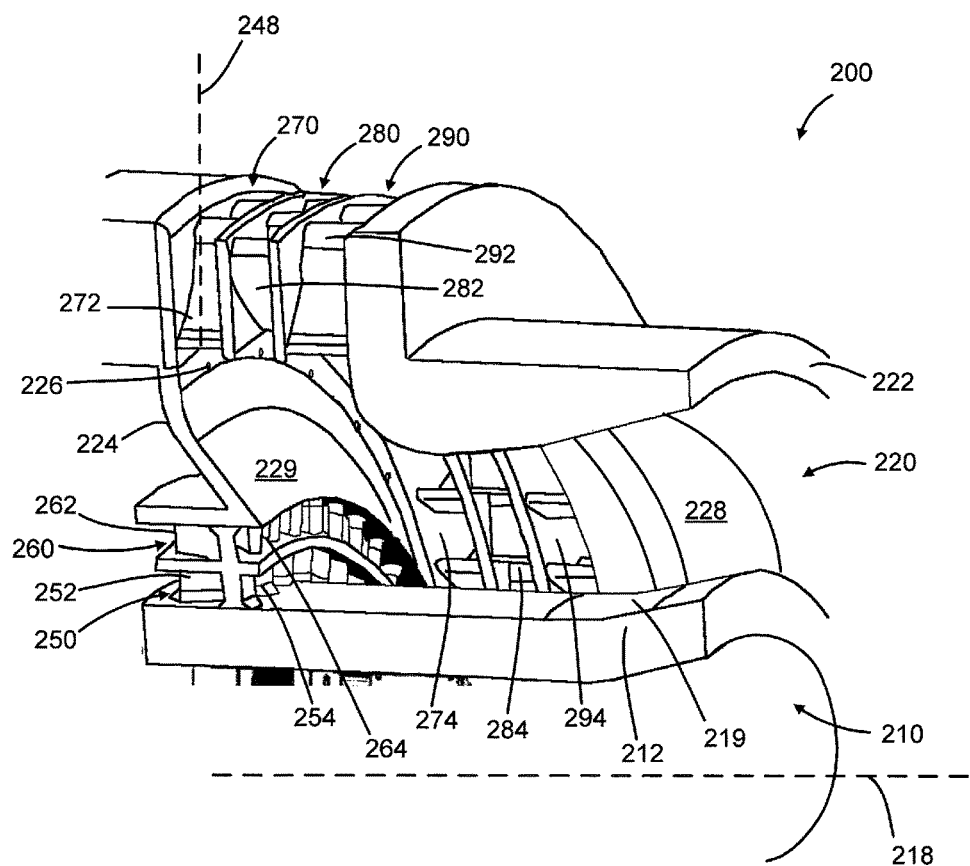
FIG. 4 is an enlarged partial perspective view of another exemplary embodiment of a mixer assembly for the exemplary combustor of FIG. 2.

FIG. 4 is an enlarged partial perspective view of another exemplary embodiment of the mixer assembly 200 for the exemplary combustor 100 of FIG. 2. As in FIG. 3, the exemplary mixer assembly 200 includes a main mixer 220 and a pilot mixer 210. The pilot mixer 210 includes an annular pilot mixer housing 212 separating and sheltering the pilot mixer 210 from the main mixer 220. The main mixer 220 further includes an annular main mixer outer radial wall 222 radially surrounding a portion of the annular pilot mixer housing 212, the outer surface of which forms an annular main mixer inner radial wall 219, and a main mixer forward wall 224 substantially perpendicular to and connecting the annular main mixer outer radial wall 222 and the annular main mixer inner radial wall 219, forming a main mixer annular cavity 228. The annular main mixer outer radial wall 222 further incorporates a plurality of outer radial wall swirlers, including a first outer radial wall swirler 270, a second outer radial wall swirler 280, and a third outer radial wall swirler 290, while the main mixer forward wall 224 further incorporates a plurality of forward wall swirlers, including a first forward wall swirler 250, a second forward wall swirler 260, and a plurality of fuel injection holes 226 circumferentially distributed between the second forward wall swirler 260 and the first outer radial wall swirler 270 around the main mixer forward wall 224. Although shown proximate to the first outer radial wall swirler 270 in the main mixer forward wall 224, the fuel injection holes 226 can be located proximate the second forward wall swirler 260 in the main mixer forward wall 224 as well. The fuel injection holes 226 are in flow communication with a fuel manifold (not shown), which in turn is in flow communication with a fuel supply. Although described with respect to liquid fuel, the exemplary embodiments of mixer assemblies 200 can also be used with gaseous fuel or partially vaporized fuel. As can be seen in FIG. 4, the first, second, and third outer radial wall swirlers 270, 280, 290 are positioned on a first side of the fuel injection holes 226, while the first and second forward wall swirlers 250, 260 are positioned on the second side of the fuel injection holes 226. In one embodiment, the first side is substantially opposite of the second side.

The first, second, and third outer radial wall swirlers 270, 280, 290 are incorporated into the annular main mixer outer radial wall 222 and each have an axis 248 oriented substantially radially to the centerline axis 218 of the mixer assembly 200. The first and second forward wall swirlers 250, 260 are incorporated into the main mixer forward wall 224 and are oriented substantially parallel or axially to the centerline axis 218 of the mixer assembly 200. Swirlers 250, 260, 270, 280, 290 each have a plurality of vanes for swirling air traveling through the swirlers to mix the air and the fuel dispensed by the fuel injection holes 226.

The first outer radial wall swirler 270 includes a first plurality of vanes 272 forming a first plurality of air passages 274 between the vanes 272. The vanes 272 are oriented at an angle with respect to axis 248 to cause the air to rotate in the main mixer annular cavity 228 in a first direction (e.g., clockwise). The second outer radial wall swirler 280 includes a second plurality of vanes 282 forming a second plurality of air passages 284 between the vanes 282. The vanes 282 are oriented at an angle with respect to axis 248 to cause the air to rotate in the main mixer annular cavity 228 in a second direction (e.g., counterclockwise). The third outer radial wall swirler 290 includes a third plurality of vanes 292 forming a third plurality of air passages 294 between the vanes 292. The vanes 292 are oriented at an angle with respect to axis 248 to cause the air to rotate in the main mixer annular cavity 228 in a third direction. In one embodiment, the third direction can be substantially the same as the first direction which are substantially opposite of the second direction.

The first forward wall swirler 250 includes a fourth plurality of vanes 252 forming a fourth plurality of air passages 254 between the vanes 252. The vanes 252 are oriented at an angle with respect to the centerline axis 218 to cause the air to rotate in the main mixer annular cavity 228 in a fourth direction (e.g., counterclockwise). The second forward wall swirler 260 includes a fifth plurality of vanes 262 forming a fifth plurality of air passages 264 between the vanes 262. The vanes 262 are oriented at an angle with respect to the centerline axis 218 to cause the air to rotate in the main mixer annular cavity 228 in a fifth direction (e.g., clockwise). In one embodiment, the fourth direction is substantially opposite of the fifth direction.

In the exemplary embodiment of the main mixer 220 shown in FIG. 4, the clockwise air passing through the first outer radial wall swirler 270 and the third outer radial wall swirler 290 counter-rates against the counterclockwise air passing through the second outer radial wall swirler 280, increasing the turbulence, which improves mixing. Also, the counterclockwise air passing through the first forward wall swirler 250 counter-rates against the clockwise air passing through the second forward wall swirler 260, increasing the turbulence, which improves mixing. In addition, the air flowing through the first, second, and third outer radial wall swirlers 270, 280, 290 has an axis 248 oriented substantially radially to the centerline axis 218 of the mixer assembly 200, while the air flowing through the first and second forward wall swirlers 250, 260 has an axis oriented substantially axially to the centerline axis 218 of the mixer assembly 200. In this configuration, the fuel is injected through the fuel injection holes 226 between the radial first, second, and third outer radial wall swirlers 270, 280, 290 and the axial first and second forward wall swirlers 250, 260.

In one embodiment, the fuel is injected through the fuel injection holes 226 that are oriented substantially perpendicularly to axis 248 and the flow of air from the plurality of outer radial wall swirlers (first, second, and third outer radial wall swirlers 270, 280, 290), which atomizes and disperses the fuel. The fuel then is atomized and dispersed again by the flow of air from the plurality of forward wall swirlers (first and second forward wall swirlers 240, 250), thus atomizing the fuel by airflow from two sides. Although shown proximate to the plurality of outer radial wall swirlers 270, 280, 290 in the main mixer forward wall 224, the fuel injection holes 226 can be located proximate the plurality of forward wall swirlers 250, 260 in the main mixer forward wall 224 and be oriented substantially perpendicularly to the axis and the flow of air from the plurality of forward wall swirlers 250, 260, which atomizes and disperses the fuel. The fuel then is atomized and dispersed again by the flow of air from the plurality of outer radial wall swirlers 270, 280, 290, thus atomizing the fuel by airflow from two sides. In either configuration, an intense mixing region 229 of fuel and air is created within annular main mixer cavity 228 axially adjacent to the fuel injection holes 226, allowing the majority of fuel and air to be mixed before entering the downstream end of the annular main mixer cavity 228. The number of axial swirlers, the number of radial swirlers, and the configuration of the vanes in the swirlers may be altered to vary the swirl direction of air flowing and are not limited to the exemplary swirl directions indicated.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention. Therefore, it is intended that the present disclosure not be limited to the particular embodiment(s) disclosed as, but that the disclosure will include all embodiments falling within the scope of the appended claims.

We claim:
1. A mixer assembly for a gas turbine engine comprising:
a main mixer comprising:
an annular inner radial wall;
an annular outer radial wall surrounding at least a portion of the annular inner radial wall, wherein the annular outer radial wall incorporates a first outer radial wall swirler with a first axis oriented radially to a centerline axis of the mixer assembly;
a forward wall extending radially outward with respect to the first axis and connecting the annular inner radial wall and the annular outer radial wall, the inner radial wall, forward wall, and outer radial wall forming a single annular cavity therebetween, wherein the forward wall incorporates a first forward wall swirler with a second axis oriented axially to the centerline axis of the mixer assembly; and
a plurality of fuel injection holes in the forward wall between the first outer radial wall swirler and the first forward wall swirler, the plurality of fuel injection holes oriented to inject a fuel into the main mixer, wherein the fuel is atomized and dispersed by airflow from the first outer radial wall swirler and is subsequently atomized and dispersed by airflow from the first forward wall swirler, wherein the first outer radial wall swirler is on a first side of the plurality of fuel injection holes and the first forward wall swirler is on a second side of the plurality of fuel injection holes, the first side being opposite the second side, wherein the plurality of fuel injection holes are oriented perpendicularly to the first axis.

2. The mixer assembly of claim 1, wherein the first outer radial wall swirler further comprises a first plurality of vanes forming a first plurality of air passages, wherein the first plurality of vanes are oriented at an angle with respect to the first axis to cause air passing through the first outer radial wall swirler to rotate in a first direction; and the first forward wall swirler further comprises a second plurality of vanes forming a second plurality of air passages, wherein the second plurality of vanes are oriented at an angle with respect to the second axis to cause the air passing through the first forward wall swirler to rotate in a second direction.

3. The mixer assembly of claim 2, wherein the first direction is opposite of the second direction.

4. The mixer assembly of claim 1, further comprising a pilot mixer, at least a portion of which is surrounded by the main mixer, wherein the pilot mixer comprises an annular housing having an outer surface that forms the annular inner wall of the main mixer.

5. The mixer assembly of claim 1, further comprising a fuel manifold in flow communication with the plurality of fuel injection holes.

6. The mixer assembly of claim 1, wherein the first side of the plurality of fuel injection holes is opposite of the second side of the plurality of fuel injection holes.

7. A mixer assembly for a gas turbine engine comprising:
a main mixer comprising:
an annular inner radial wall;
an annular outer radial wall surrounding at least a portion of the annular inner radial wall, wherein the annular outer radial wall incorporates a plurality of outer radial wall swirlers with a first axis oriented radially to a centerline axis of the mixer assembly;
a forward wall extending radially outward with respect to the first axis and connecting the annular inner radial wall and the annular outer radial wall, the inner radial wall, forward wall, and outer radial wall forming a single annular cavity therebetween, wherein the forward wall incorporates a first forward wall swirler with a second axis oriented axially to the centerline axis of the mixer assembly; and
a plurality of fuel injection holes in the forward wall between the plurality of outer radial wall swirlers and the first forward wall swirler, the plurality of fuel injection holes oriented to inject a fuel into the main mixer, wherein the fuel is atomized and dispersed by airflow from the first outer radial wall swirler and is subsequently atomized and dispersed by airflow from the first forward wall swirler, wherein the plurality of outer radial wall swirlers is on a first side of the plurality of fuel injection holes and the first forward wall swirler is on a second side of the plurality of fuel injection holes, the first side being opposite the second side, wherein the plurality of fuel injection holes are oriented perpendicularly to the first axis.

8. The mixer assembly of claim 7, wherein the plurality of outer radial wall swirlers further comprises:
a first outer radial wall swirler comprising a first plurality of vanes forming a first plurality of air passages, wherein the first plurality of vanes are oriented at an angle with respect to the first axis to cause air passing through the first outer radial wall swirler to rotate in a first direction; and
a second outer radial wall swirler comprising a second plurality of vanes forming a second plurality of air passages, wherein the second plurality of vanes are oriented at an angle with respect to the first axis to cause the air passing through the second outer radial wall swirler to rotate in a second direction.

9. The mixer assembly of claim 8, wherein the first direction is opposite of the second direction.

10. The mixer assembly of claim 8, wherein the plurality of outer radial wall swirlers further comprises a third outer radial wall swirler comprising a third plurality of vanes forming a third plurality of air passages, wherein the third plurality of vanes are oriented at an angle with respect to the first axis to cause air passing through the third outer radial wall swirler to rotate in a third direction.

11. The mixer assembly of claim 10, wherein the first direction is the same as the third direction.

12. The mixer assembly of claim 7, wherein the first forward wall swirler further comprises a first plurality of vanes forming a first plurality of air passages, wherein the first plurality of vanes are oriented at an angle with respect to the second axis to cause air passing through the first forward wall swirler to rotate in a fourth direction.

13. The mixer assembly of claim 7, further comprising a second forward wall swirler proximate the first forward wall swirler.

14. The mixer assembly of claim 13, wherein the second forward wall swirler further comprises a second plurality of vanes forming a second plurality of air passages, wherein the second plurality of vanes are oriented at an angle with respect to the second axis to cause air passing through the second forward wall swirler to rotate in a fifth direction.

15. The mixer assembly of claim 14, wherein the fourth direction is opposite of the fifth direction.

16. The mixer assembly of claim 7, wherein the first side of the plurality of fuel injection holes is opposite of the second side of the plurality of fuel injection holes.

\* \* \* \* \*